United States Patent [19]

Atalla

[11] Patent Number: 4,588,991
[45] Date of Patent: May 13, 1986

[54] FILE ACCESS SECURITY METHOD AND MEANS

[75] Inventor: Martin M. Atalla, Atherton, Calif.

[73] Assignee: Atalla Corporation, San Jose, Calif.

[21] Appl. No.: 472,609

[22] Filed: Mar. 7, 1983

[51] Int. Cl.$^4$ .......................... H04Q 9/00; H04L 9/00
[52] U.S. Cl. ................................ 340/825.31; 235/382; 340/825.34; 178/22.08; 178/22.09
[58] Field of Search ...................... 340/825.31, 825.34; 235/380, 382

[56] References Cited

U.S. PATENT DOCUMENTS 4,326,098 4/1982 Bouricius et al. .................. 235/380
4,423,287 12/1983 Zeidler .............................. 235/382

Primary Examiner—Donald J. Yusko
Attorney, Agent, or Firm—A. C. Smith

[57] ABSTRACT

An improved file access security technique and associated apparatus accesses data which is stored in encrypted form under one encryption key and re-stores the data re-encrypted under another encryption key, and produces a record of each access and data re-encryption both as the control source of encryption keys for access and re-entry of encrypted data and as a secured audit record of users that had access to each file.

13 Claims, 4 Drawing Figures

| KEYCODE → | $K_1$ | $K_2$ | $K_3$ | $K_4$ | - - - | $K_M$ |
|---|---|---|---|---|---|---|
| FILE NUMBER | | | | | | |
| 01001 | * | | | | | |
| 11010 | * | | | | | |
| 00001 | | | | * | | |
| 00100 | | | 37 | 41 * | | |
| 00110 | | * | * | * | | |
| - - - | | | | | | |
| 10110 | | | | | | |

FIG. 4

FILE ACCESS SECURITY METHOD AND MEANS

BACKGROUND OF THE INVENTION

Many known computer-controlled operations on secured data files require verification of the identity of an individual seeking to access a file before the data (usually in encrypted form) can be accessed (see, for example, U.S. Pat. Nos. 3,938,091, 3,587,051, 3,611,293 and 4,198,619). In addition, many known record-securing schemes including those associated with credit cards, require verification of both the authority of the using individual and the authenticity of the data in the record, to protect against unauthorized users and against counterfeit or duplicate records. Schemes of this type are disclosed in U.S. Pat. Nos. 4,304,990, 4,328,414 and 4,357,429.

One disadvantage associated with computer-controlled security schemes of these types is that there is typically no indication left on file of which secured record was accessed, or by whom.

SUMMARY OF THE INVENTION

In accordance with the preferred embodiment of the present invention, a dynamic record of encryption control keys used to gain access initially and at all subsequent occasions to secured encrypted files is generated both as an active element of the accessing scheme and as a secured, historic record for audit purposes of all accesses to encrypted files. In addition, substitutions of outdated files are prevented once a file is accessed, even merely for display without alteration, so that a file once accessed, and therefore with its security compromised, can be re-secured against duplication, substitution, and re-use. Schemes of this type are particularly useful in banking and funds-transfer operations where proper access initially to an account file, for example, to effect a withdrawal of funds, must thereafter be carefully controlled to avoid such disastrous practices as multiple replications of the same operation coupled with substitution of the original balance back into the file. Further, the historic record of accesses to files produced by the present invention constitutes an audit record in encrypted form of such accesses.

DESCRIPTION OF THE DRAWINGS

FIG. 4 is a chart illustrating the formation and operation of the key usage control file according to the present invention.

DESCRIPTION OF THE PREFERRED EMBODIMENT

Figure 1:
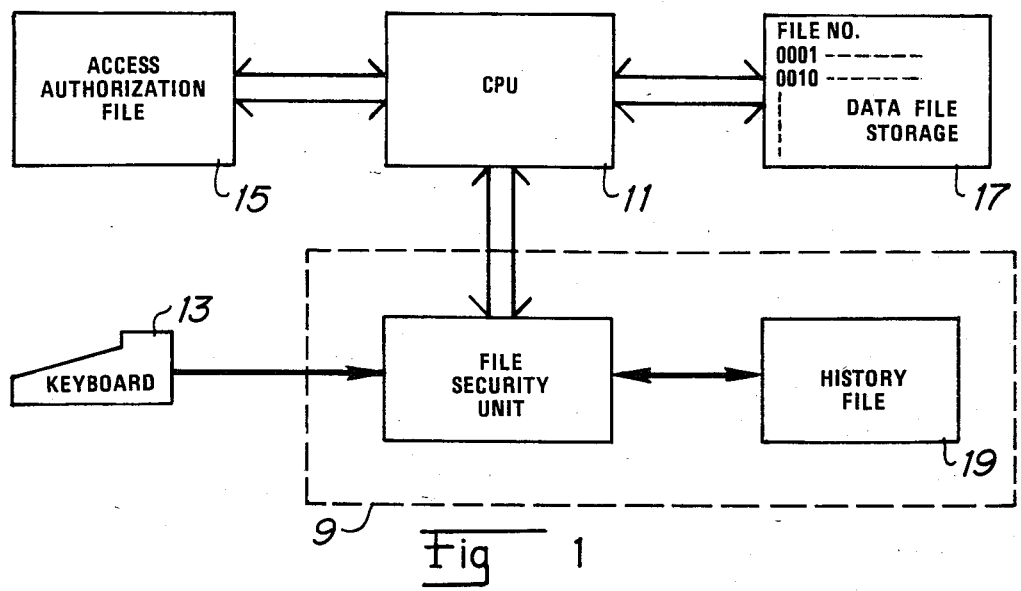
FIG. 1 is a pictorial block diagram showing one application of the apparatus of the present invention.

Referring now to FIG. 1, there is shown a pictorial block diagram of the present invention illustrating the addition of an access-securing module 9 to a typical computer system comprising a central-processing unit 11, keyboard controller 13, and memory means 15, 17 for storing files. The memory means 15, 17 may use any conventional form of storage technology such as semiconductor memory, magnetic memory in core, crystal, disc, drum, or tape form, and any combinations thereof, to store the data 17 to which access is to be controlled, and to store access authorization information 15 about individuals and entities that may access the stored data 17. Keyboard 13 provides manual-entry access to the computer system in conventional manner and is representative of other computer-accessing schemes such as by another computer system, and the like.

In accordance with the present invention, such a typical computer system is modified to include access-securing module 9 which operates with the computer system to progressively reencrypt the data in storage in memory means 17 each time a file is accessed, and optionally to update the access authorization information in storage in memory means 15 in response to authorizations granted, and to generate historic files in encrypted form of the encryption keys used to decrypt and reencrypt each file accessed from memory means 17. In addition, the module 9 operates in a controlled reinitialization mode to restore all files in memory means 17 to a new, standard encryption key after numerous accesses of files in storage 17 have been authorized. The number of accesses before requiring reinitialization is determined by the memory capacity in the module 9.

Figure 3:
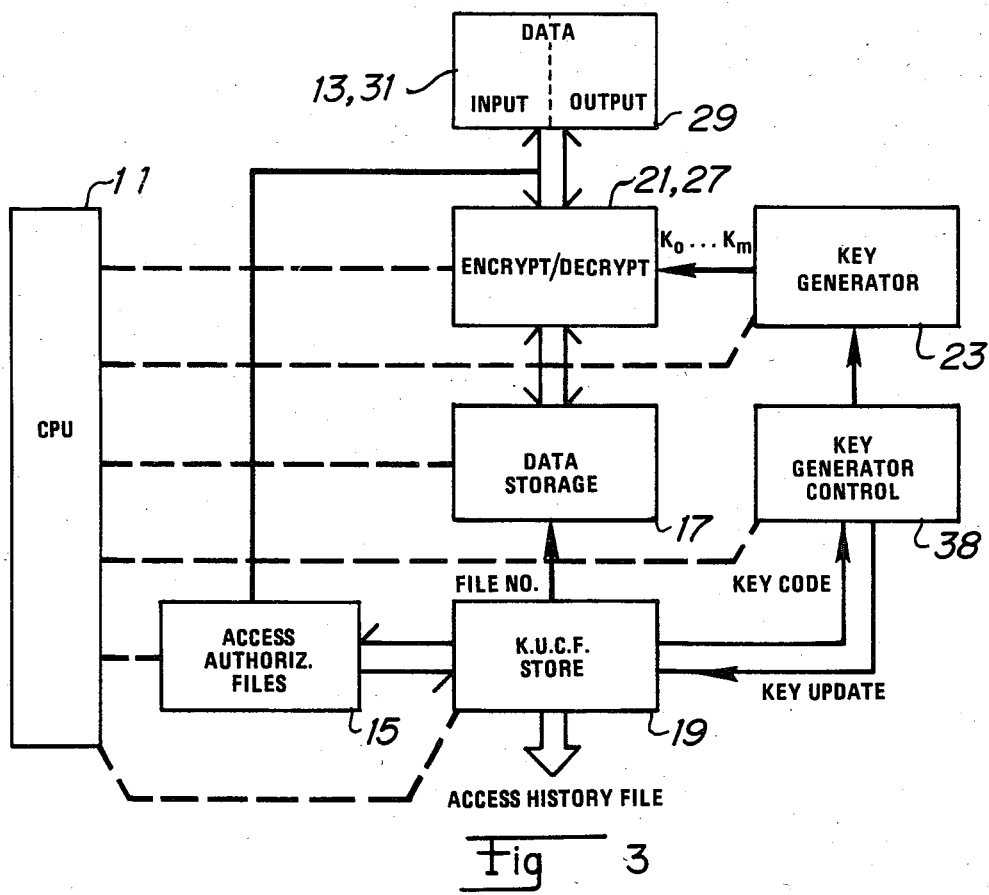
FIG. 3 is a block diagram of the illustrated embodiment of the present invention.
Figure 2:
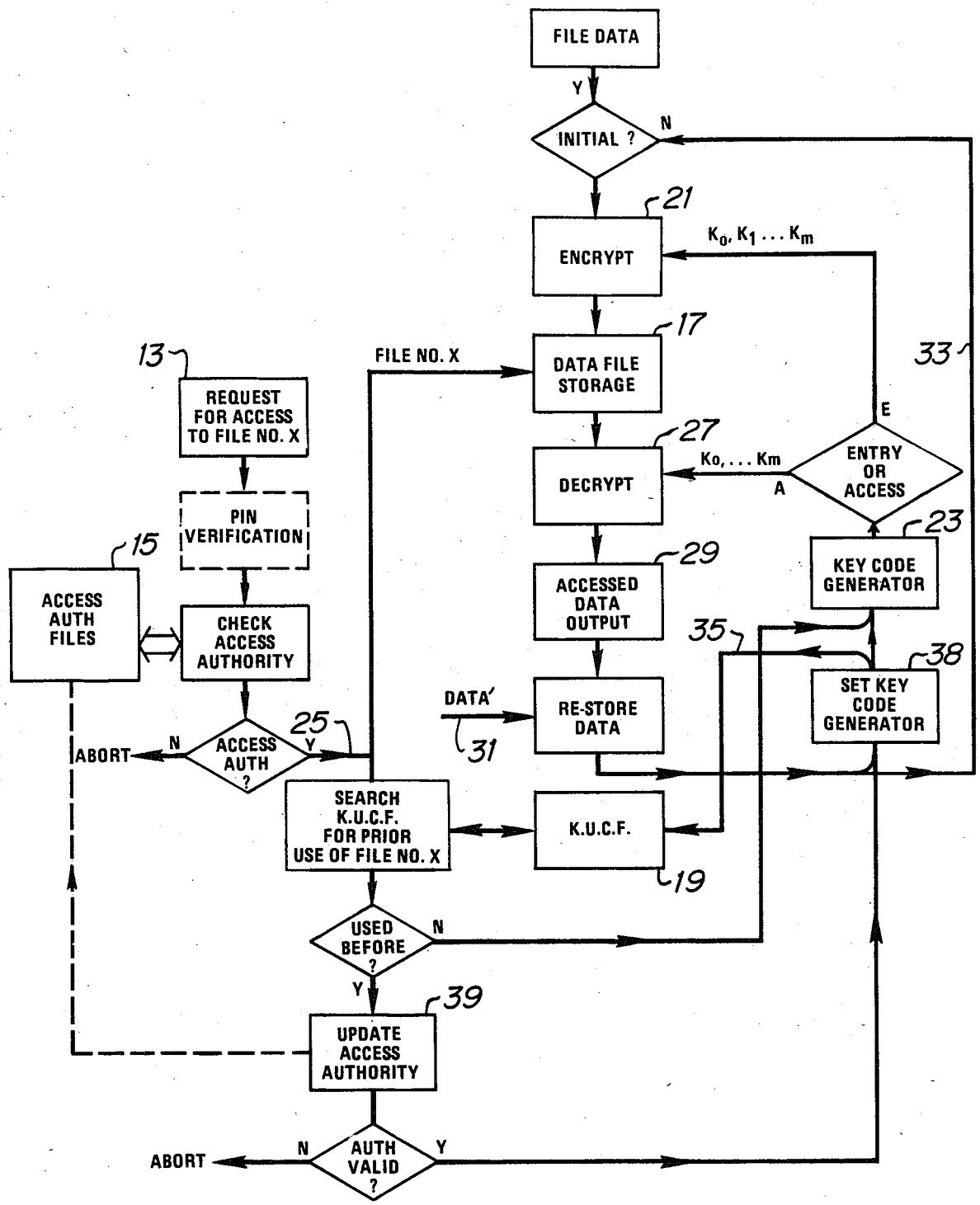
FIG. 2 is a flow chart illustrating the operation of the apparatus of FIG. 1.

Referring now to FIGS. 2 and 3 in addition to FIG. 1, there are shown a flow chart and a block diagram, respectively, illustrating the operation of the system of FIG. 1 under control of a central processing unit 11. In operation, a person or entity, R, requesting access to a particular file may enter personal identification numbers, information about the particular file, and the like, via keyboard 13. Optionally, a personal-identity verification routine 21 may be performed in conventional manner (as disclosed, for example, in U. S. Pat. No. 3,938,091 or 4,198,619) and the access-authorization files 15 may be searched for authorization to access the requested file. All such files in memory means 17 are initially encrypted with an initial key code, $K_0$, in a conventional manner (for example, using the Data Encryption Standard module available from the National Bureau of Standards) by encrypting the file data in encryption module 21 with key code, $K_0$, from key code generator 23.

With authorization established 25, the particular file #X may be accessed, but decrypting the file #X requires the correct key code. For this purpose, the key-usage control file 19, later described herein in detail, is searched to determine if the file #X was previously accessed. The conditions of prior access, namely, that it was, or it was not previously accessed, are possible. If it was not, then file #X will not appear in the key-usage control file, an indication that it appears in storage 17 encrypted with the initial key code, $K_0$. Key generator 23 is capable of generating a sequence of different key codes $K_0, K_1, K_2, K_3 \ldots K_n$ and is set to supply key code $K_0$ to the decryption 27 (which, of course, may be the same type of DES module, or may be the same module, as encryption module 21). The requested file #X may therefore be decrypted in conventional manner using key code $K_0$ to provide the accessed data 29 in clear text. The data is then returned to storage, either without or with new data modifications 31 that reflect a data-oriented transaction such as sale, deposit, withdrawal, or the like, and is re-stored in encrypted form using new key code $K_1$. This is accomplished by resetting 38 the key code generator 23 to supply key code $K_1$ to the encryption module 21 and returning the data 33 with or without modifications for encryption in module 21 with the key code $K_1$. In addition, the key-usage control file 19 is updated to reflect that file #X was accessed and now resides in storage newly-encrypted with the new key code $K_1$ in the sequence. Further, the access-authorization files 15 may be updated optionally to inhibit further access to file #X by user R, for example, to inhibit R's further access until a "new date", or until accessed by another user, or the like. Subsequent access to file #X by user R, if continuously authorized, or by any other user must be via decryption with key code $K1_1$.

If file #X was previously accessed, then the key-usage control file 19 will contain the entry of file #X having been previously accessed and returned to storage encrypted with a new key code $K_1, K_2 \ldots K_n$, depending upon the number of previous accesses to file #X. Thus, with reference to the chart of FIG. 4 which illustrates the typical entries in the key-usage control file 19, if file #X is file #00100, then the previous accesses to this file resulted in its being re-stored encrypted with key code $K_2$ (at entry 37). The search of the key-usage control file 19 thus indicates that file #00100 was previously accessed twice and now requires decryption with key code $K_2$. If authorization of the requesting user is still valid 39, then the key code generator 23 is set to supply the key code $K_2$ to decryption module 27 in order to furnish the data in this file in clear text 29. Re-storing the data from this file in modified or unmodified form is accomplished by resetting 38 the key code generator 23 to supply key code K3 (entry 41 in FIG. 4) to the encryption module 17 for encryption therein of the returned data with the new key code K3. All retrievals of data in storage 17 may be by destructive read of information in the addressed file so that data for restoring therein may be written in the newlyencrypted form. After numerous accesses to files in storage 17, the key-usage control file 19 will typically include entries as illustrated in FIG. 4. Such file optionally may also include codes to identify the particular users who gained access to each file. The file 19 thus provides an audit record of the accesses to the files in storage 17. In addition, the key-usage control file 19 is in encrypted form since it neither reveals the data in storage 17 nor the actual key codes $K_1 \ldots K_n$ (only generated by generator 23) required to decrypt the data in storage 17. Further, the key codes $K_0 \ldots K_n$ which serve as file-protect codes can be generated internally in conventional manner, for example, by a random-number generator 23 and therefore need not be known to anyone.

After numerous accesses to the data in storage 17 which approaches the limit of the sequence of key codes for any particular file, or on a periodic basis, the entire collection of files in storage 17 may be re-encrypted with a new initial key code $K_0'$ of a sequence of new key codes $K_0', K_1' \ldots K_n'$ using the apparatus illustrated in FIG. 3 under control of the central processing unit 11. However, since the files in storage 17 are encrypted with different key codes, the key-usage control file 19 must be consulted to determine which key code to use to decrypt the data in each file for re-encryption with a new initial key code $K_0'$. After completion of this reinitialization mode of operation, the key-usage control file 19 for the sequence of key codes $K_0 \ldots K_n$ may be retired to serve as an historic record of access to the data in storage 17 without compromising the security of the system or of the data in storage 17 under new encryption codes.

I claim:

1. Method of securing data files in storage against unauthorized access, comprising the steps of:
encrypting file data as a selected logical combination thereof with an initial one of a plurality of encryption key codes to produce file data in encrypted form for storage at selected file address locations;
establishing a record of accesses to each selected file address location and the one of the plurality of encryption key codes with which the file data at the address location is encrypted;
processing a request for access to file data at a selected file address location by determining from the record the number of prior accesses thereof and the encryption key code associated therewith;
decrypting file data at the selected file address location using said associated encryption key code;
re-encrypting file data for said selected file address location using a new one of said plurality of encryption key codes in said selected logical combination;
storing the newly re-encrypted file data at the accessed file address location; and
modifying the record to indicate an additional access to the selected file address location and the new encryption key code associated therewith.

2. Method of securing data files according to claim 1 wherein in the step of decrypting, file data at a selected file address location is decrypted using said initial encryption key code in response to determination from the record that said selected file address location was not previously accessed.

3. Method of securing data files according to claim 1 comprising the additional steps of establishing a file of user access authorizations; and prior to accessing a selected file address location
determining the authorization status of a user to gain access to the selected file address location.

4. Method of securing data files according to claim 3 comprising the additional step of selectively altering the access authorization of a user to gain subsequent access to the selected file address location in response to re-encryption of the file data for storage at the selected file address location.

5. Method of securing data files according to claim 1 comprising the steps of:
reinitializing all the file data by decrypting the file data at each selected file address location using the encryption key code therefor determined from the record; and
re-encrypting the file data at each such file address location using a new initial one of a plurality of key codes.

6. Method of securing data files according to claim 5 wherein in the reinitialization step the file data at any file address location which is not indicated in the record to have been accessed previously is decrypted using the initial encryption key code.

7. Apparatus for securing data files in storage against unauthorized access, comprising:
storage means for storing file data in encrypted form at selectable file address locations;
encryption means for supplying encrypted file data to a selected file address location as the logical encoding combination of file data and an encryption key signal applied thereto;
generator means for applying selected encryption key signals to the encryption means;

record means for producing indication of selected file address locations and key code signals associated with encryption of file data stored therein;

circuit means responsive to identification of a selected file address location for determining from said record means the encryption key signal associated therewith for setting the generator means to supply the associated encryption key signal;

decryption means disposed to receive encryption key signals from the generator means and encrypted file data from the storage means and operable in accordance with said logical encoding combination to decrypt the file data at said selected file address location; and means operable upon the decrypted file data for altering the generator means to supply a new encryption key signal for restoring the file data at the selected file address location newly encrypted with a new encryption key signal, said means altering the record means to produce an indication of the new encryption key signal associated with file data in the selected file address location.

8. Apparatus as in claim 7 wherein said circuit means is responsive to the indication in said record means that a selected file address location was not previously accessed for setting said generator means to supply the initial encryption key signal to the decryption means.

9. Apparatus according to claim 7 comprising:

access record means for storing data representative of the authorization of users to selectively access file data in said storage means; and means disposed to receive identification data from a user, and coupled to said circuit means for inhibiting the generator means from supplying an encryption key signal to said decryption means for an unauthorized, identified user.

10. Apparatus as in claim 9 comprising means responsive to re-storing of file data at the selected file address location newly encrypted with a new encryption key signal for altering the identified user's authorization in said access record means to access said selected file address location.

11. Apparatus as in claim 7 comprising initializing means coupled to said generator means, said encryption means and decryption means and to said record means for setting the generator means to selectively decrypt file data in each file address location using the encryption key signals from said generator means established from the record means for each such file address location, and for re-encrypting the decrypted file data for each file address location using a new initial encryption key signal for re-storage at the respective file address location.

12. Apparatus as in claim 11 wherein said initializing means responds to indication from said record means of no previous access to a selected file address location for decrypting file data therein in using an initial encryption key signal and for re-encrypting the decrypted file data using a new initial encryption key signal to re-store the newly encrypted file data at the respective file address location.

13. A file access record produced by the process comprising the steps of:

storing at selected file address locations file data that is encrypted as the logical combination of file data and selected ones of a plurality of encryption key signals;

decrypting file data at a selected file address location using the encryption key signal associated therewith in accordance with said logical combination;

re-encrypting the decrypted file data as a logical combination thereof and a new encryption key signal for restoring at the corresponding file address location; and producing said file access record as the compilation at least of the number of times each selected file address location was decrypted and information indicative of the encryption key signals with which the file data at each selected file address location was re-encrypted and re-stored therein.

* * * * *